March 3, 1953 P. E. GAYLARD ET AL 2,630,340
COMPOSITE TANK FITTING
Filed Aug. 2, 1949
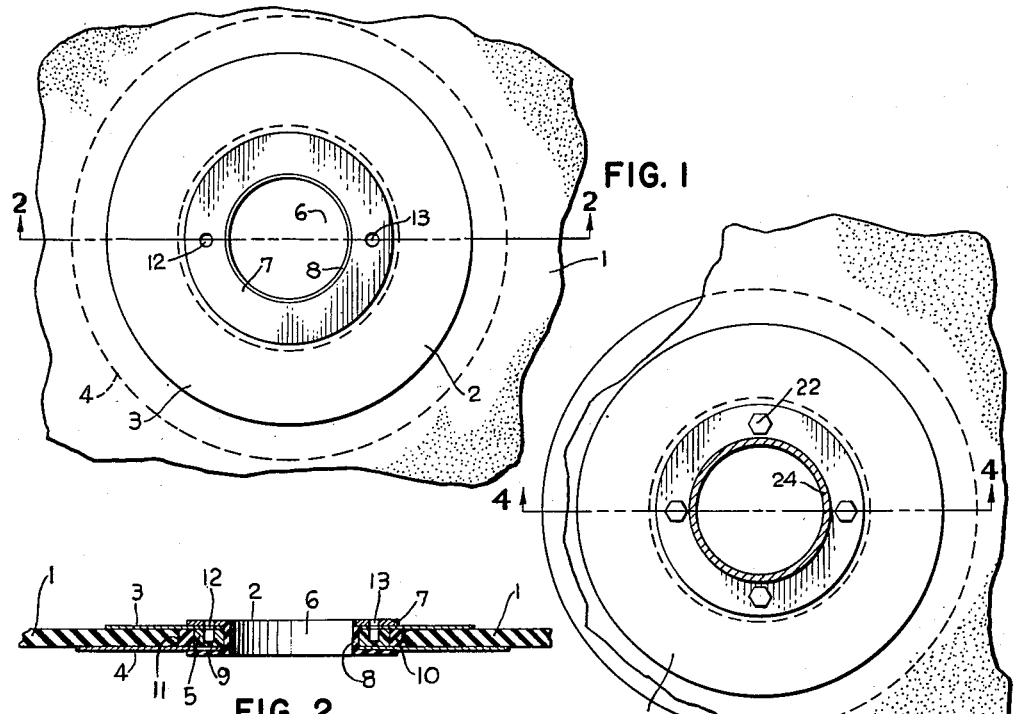
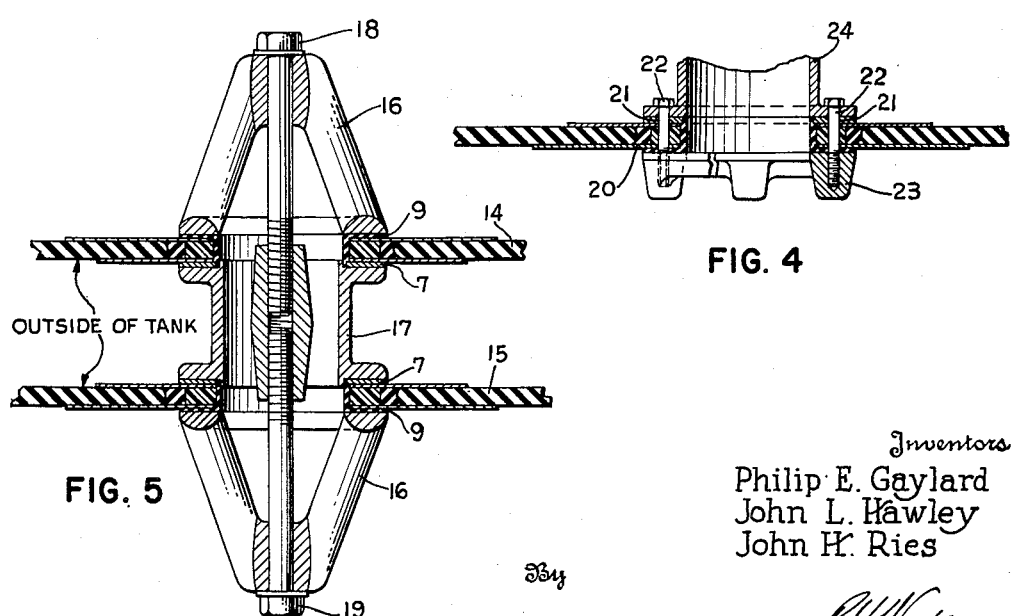
Inventors
Philip E. Gaylard
John L. Hawley
John H. Ries
By R H Waters
ATTORNEY Patented Mar. 3, 1953

2,630,340

UNITED STATES PATENT OFFICE 2,630,340

COMPOSITE TANK FITTING

Philip E. Gaylard, Los Angeles, Calif., and John L. Hawley, Akron, and John H. Ries, Barberton, Ohio, assignors to Wingfoot Corporation, Akron, Ohio, a corporation of Delaware Application August 2, 1949, Serial No. 108,214

5 Claims. (Cl. 285—38)

1

The present invention relates to a composite fitting for defining an opening in a tank, container and the like. More particularly, the invention pertains to an improved form of fitting for the purpose of providing fastening means for other attachments, such, for example, as equipment, connectors, conduits and the like, and is especially adapted for use with flexible containers, such, for example, as bullet sealing tanks or cells for the storage and carrying of gasoline, oil, etc., in military aircraft.

Tanks of this type are of many shapes and sizes because they are built to fill all the available space in the aircraft structure in order to provide the maximum storage capacity. The fittings normally used with these fuel cells have molded rubber flanges to tie the fitting into the wall structure of the cell. The rubber flanges are not sufficiently flexible to allow them to be shaped to fit the various contours of the different cells so that it is necessary to mold or form them to the approximate contour of the tank at the particular location where they are to be located. This necessitates the use of two, three and four plane molds which are not only very expensive but in many instances, it is very difficult to obtain satisfactory fittings from such a mold. Very little standardization of fuel cell fittings is possible with fittings manufactured in this manner.

The present invention provides a fitting with very flexible and strong flanges that can be fitted to any fuel cell regardless of the shape of the cell. A standard line of fittings may be established, the only differences being in the size of the opening provided and the method provided for fastening the attachments to the fitting.

Weight has always been a critical factor in airplane construction and bullet-sealing fuel cells are inherently heavy due to the amount of material necessary to provide the proper sealing effects. The fittings previously used are relatively heavy because of the large amount of synthetic rubber in the assembly whereas the fittings made in accordance with the practice of this invention are much lighter in weight, consequently an important saving in weight is effected.

Among the objects of this invention are to provide a fitting that can be incorporated into any shape cell or tank without molding to the particular shape; to provide a fitting that is light in weight and at the same time very strong; to provide a standardized line of fittings for use in bullet-sealing fuel cell construction; to provide a fitting that is simple in construction and can be manufactured economically; and to provide a

2 fitting with very flexible and strong flanges to facilitate the fabrication of the fitting into the fuel cell structure. Other objects of this invention will appear hereinafter as the description thereof proceeds; and the features, arrangements and combinations being clearly pointed out in the specification and in the claims thereunto appended.

In the drawings:

Fig. 1 is a plan view of a portion of the fuel cell with the fitting in position;

Fig. 2 is a cross section taken on line 2—2 of Fig. 1;

Fig. 3 is a fragmentary plan view of a modification of the invention;

Fig. 4 is a cross section taken on line 4—4 of Fig. 3; and

Fig. 5 is a cross sectional view of a typical use of the fitting as shown in Figs. 1 and 2.

Referring to Figs. 1 and 2, the numeral 1 indicates a portion of the usual bullet sealing fuel cell wall with the fitting 2 joined to the wall. The fitting 2 is provided with a pair of flexible flanges 3 and 4 of a high strength, lightweight fabric material such, for example, as nylon, which are used to tie the fitting into the wall structure of the fuel cell. The flanges 3 and 4 are of sufficient size so as to provide an adequate surface for properly fabricating the fitting into the wall structure of the cell and, at the same time, are sufficiently flexible so that they can be made to conform to the contour of the cell without molding or pre-forming to the contour of the cell.

Located between the fabric flanges 3 and 4 is a strength member 5 which is, as illustrated, formed of layers or plies of phenolic resin impregnated fabric which provide a very strong and lightweight member after being formed under heat and pressure. The inner periphery of flanges 3 and 4 and the strength member 5 are concentric with opening 6, and, as illustrated, the opening 6 is shown to be circular although any shape of opening may be provided. An annular member 7 of metal (a lightweight metal such as aluminum may be advantageously used) is provided on the exterior surface of flange 3 in order that there will be a good surface for the seating of any attachment fastened to the fitting in the tank or cell assembly.

A relatively thin layer 8 of a suitable fuel resistant plastic material, such as neoprene, Buna-N, Thiokol, and the like, lines the opening 6 and extends around onto the exterior surface of flange 4 to provide a smooth surface 9 and seal for the seating of the attachment. The layer 8 of fuel resistant plastic material prevents the fuel from having any adverse effects on the strength member 5 by preventing the fuel from contacting the strength member 5 and also serves as a bonding agent between the various parts of the fitting. A fuel resistant member 10 also extends around the outer periphery of the strength member 5 between the flanges 3 and 4 to protect the strength member 5 from the effects of the fuel as well as eliminate any concentrated stress areas which might possibly cause the flanges to rupture while the cell is in use. The concave surface 11 of the member 10 also provides a smooth surface for the application of a fuel resistant barrier such, for example, as nylon cement, as a further precaution against the effects of the fuel on either the tank or the fitting.

The fitting 2 as illustrated in Figs. 1 and 2 is advantageously fabricated by building up its component parts in a mold cavity (not shown), then vulcanizing into an integral structure under heat and pressure by any of the well known methods in the art. One method of positively locating the component parts of the fitting 2 in the mold cavity is to provide locating pins (not illustrated) over which the plies of the strength member 5 and the annular ring 7 are placed before vulcanization. The locating pins form the apertures 12 and 13 in the finished fitting. The various component parts may be fabricated separately and then finally integrally assembled at a later time and the locating pins would not necessarily be needed for this method.

Figure 5 illustrates a typical use of the fitting 2 in which two adjacent fuel cells 14 and 15 are connected by means of spider interconnectors 16 and the adapter interconnector 17. The adaptor interconnector 17 seats against the annular members 7 of the fitting 2 of cells 14 and 15 and the spider interconnector 16 seats against fuel resistant plastic surface 9 of the respective fittings. By tightening bolts 18 and 19, the spiders 16 and adapter 17 are drawn into intimate contact with the fittings 2 to prevent any leakage of the fuel.

A fitting 20, similar to the previously described fitting 2, is illustrated in Figs. 3 and 4, but openings 21 are provided in the fitting 20 to allow the bolts 22 to pass through in order that the attachments may be fastened to the fitting. Various means may be used in conjunction with the fitting 20 to hold the attachments in place, as for example, the dome nut ring 23, as illustrated in Figs. 3 and 4. For the purpose of illustration of the use of a fitting of this type, a flanged sleeve or conduit 24 is held in sealed relationship with the fitting 20 by the bolts 22 which enter the tapped openings in the dome nut ring 23.

It is apparent from the above description that a large range of sizes and shapes of the openings can be made with relatively small mold expense because fittings of this type will be universal in their application. The flexibility of the flanges will permit the fitting to be built into any fuel cell, regardless of the size or contour, with very little difficulty.

While certain representative embodiments and details have been shown for the purpose of illustrating the invention, it will be apparent to those skilled in this art that various changes and modifications may be made therein without departing from the spirit or scope of the invention.

We claim:
1. A composite fitting for defining an opening in a fuel container wall and the like, said fitting comprising a rigid plastic strength member having an opening therein disposed in substantially concentric relation to the opening in the container wall; a pair of spaced apart flexible rubberized fabric flanges having an opening therein substantially coextensive with the opening in said strength member disposed adjacent to and extending beyond said strength member for fastening the fitting to the wall structure of the container, the space between the flanges being substantially equal to the thickness of the wall structure of the container; a metal member extending around the periphery of said opening on the outer surface of one of said flanges; a fuel resistant plastic layer lining the inner periphery of said openings in the strength member and flanges whereby intimate contact of the strength member and flanges by the fuel is prevented, said lining extending around the periphery of said opening on the outer surface of the other of said flanges substantially coextensive with the surface area of said strength member; and a fuel resistant plastic member between said flanges and extending around the outer periphery of said rigid plastic strength member, all of the elements of said fitting being bonded together to form an integral structure.

2. A composite fitting for defining an opening in a fuel container wall and the like, said fitting comprising a rigid plastic strength member having an opening therein disposed in substantially concentric relation to the opening in the container wall; a pair of spaced apart fuel resistant flexible rubberized fabric flanges having an opening therein substantially coextensive with the opening in said strength member disposed adjacent to and on opposite sides of said strength member for fastening the fitting to the wall structure of the container, the space between the flanges being substantially equal to the thickness of the wall structure of the container; a metal member extending around the periphery of said opening on the outer surface of one of said flanges substantially coextensive with the surface area of said strength member; a fuel resistant plastic layer lining the inner periphery of said openings in the strength member and flanges whereby intimate contact of the strength member and flanges by the fuel is prevented; and a fuel resistant plastic member between said flanges and extending around the outer periphery of said rigid plastic strength member, all of the elements of said fitting being bonded together to form an integral structure.

3. A composite fitting for defining an opening in a fuel container wall and the like, said fitting comprising a rigid annular laminated plastic strength member having an opening therein disposed in substantially concentric relation to the opening in the container; a pair of spaced apart flexible fuel-resistant rubberized fabric flanges having an opening therein substantially coextensive with the opening in said strength member disposed adjacent to and extending beyond said strength member for fastening the fitting to the wall structure of the container, the space between the flanges being substantially equal to the thickness of the wall structure of the container; a metal member extending around the periphery of said opening on the outer surface of one of said flanges; a fuel resistant plastic layer lining the inner periphery of said openings in the strength member and flanges whereby intimate contact of the strength member and flanges by the fuel is prevented, said lining extending around the periphery of said opening on the outer surface of the other of said flanges and substantially coextensive with the surface area of said strength member; and a fuel resistant plastic member between said flanges and extending around the outer periphery of said rigid plastic strength member, all of the elements of said fitting being bonded together to form an integral structure.

4. A composite fitting for defining an opening in a fuel container wall and the like, said fitting comprising a rigid plastic strength member having an opening therein disposed in substantially concentric relation to the opening in the container wall; a pair of spaced apart flexible fuel-resistant rubberized fabric flanges having an opening therein substantially coextensive with the opening in said strength member disposed adjacent to and extending beyond said strength member for fastening the fitting to the wall structure of the container, the space between the flanges being substantially equal to the thickness of the wall structure of the container; a metal member extending around the periphery of said opening on the outer surface of one of said flanges and being substantially coextensive with the surface area of said strength member; a fuel resistant plastic layer lining the inner periphery of said openings in the strength member and flanges whereby intimate contact of the strength member and flanges by the fuel is prevented, said lining extending around the periphery of said opening on the outer surface of the other of said flanges, said strength member, flanges, metal member and fuel resistant layer having a plurality of aligned apertures therein; and a fuel resistant plastic member between said flanges and extending around the outer periphery of said rigid plastic strength member, all of the elements of said fitting being bonded together to form an integral structure.

5. A composite fitting for defining an opening in a fuel container wall and the like, said fitting comprising a rigid plastic strength member having an opening therein disposed in substantially concentric relation to the opening in the container wall; a pair of spaced apart flexible fuel-resistant rubberized fabric flanges having an opening therein substantially coextensive with the opening in said strength member disposed adjacent to and on opposite sides of said strength member for fastening the fitting to the wall structure of the container, the space between said flanges being substantially equal to the thickness of the wall structure of the container; a metal member extending around the periphery of said opening on the outer surface of one of said flanges and being substantially coextensive with the surface area of said strength member; a plurality of aligned spaced openings through the strength member flanges and metal member; a fuel resistant plastic layer lining the inner periphery of said opening in the strength member and flanges whereby intimate contact of the strength member and flanges by a fuel is prevented; and a fuel resistant plastic member between said flanges and extending around the outer periphery of said rigid plastic strength member, all of the elements of said fitting being bonded together to form an integral structure.

PHILIP E. GAYLARD.
JOHN L. HAWLEY.
JOHN H. RIES.

REFERENCES CITED

The following references are of record in the file of this patent:

UNITED STATES PATENTS

| Number | Name | Date |
| --- | --- | --- |
| 2,326,263 | Steiner | Aug. 10, 1943 |
| 2,366,442 | Cunningham | Jan. 2, 1945 |
| 2,370,799 | Kelley | Mar. 6, 1945 |
| 2,441,009 | Cunningham | May 4, 1948 |